(12) United States Patent
Zhang et al.

(10) Patent No.: US 12,375,764 B2
(45) Date of Patent: Jul. 29, 2025

(54) SYSTEM AND METHOD FOR ENHANCING RESOLUTION OF VIDEO CONTENT

(71) Applicant: Star India Private Limited, Mumbai (IN)

(72) Inventors: Youqiang Zhang, Beijing (CN); Tao Xiong, Beijing (CN)

(73) Assignee: STAR INDIA PRIVATE LIMITED, Mumbai (IN)

(*) Notice: Subject to any disclaimer, the term of this patent is extended or adjusted under 35 U.S.C. 154(b) by 71 days.

(21) Appl. No.: 18/339,942

(22) Filed: Jun. 22, 2023

(65) Prior Publication Data
US 2023/0421851 A1    Dec. 28, 2023

(30) Foreign Application Priority Data
Jun. 24, 2022 (IN) ............................ 202221036484

(51) Int. Cl.
*H04N 21/462* (2011.01)
*H04N 21/44* (2011.01)
*H04N 21/472* (2011.01)

(52) U.S. Cl.
CPC ... *H04N 21/4621* (2013.01); *H04N 21/44008* (2013.01); *H04N 21/472* (2013.01)

(58) Field of Classification Search
CPC ......... G06T 5/002; G06T 5/003; G06T 5/004; G06T 2207/20192; G06T 2207/20201; G06T 3/4053; G06T 3/4061; G06T 3/4069; G06T 3/4076; G06T 3/40; G06T 3/4007; G06V 10/34; G06V 30/168; H04N 19/117; H04N 19/439; H04N 19/615; H04N 19/80; H04N 19/82; H04N 19/86
See application file for complete search history.

(56) References Cited

U.S. PATENT DOCUMENTS

2023/0153946 A1* 5/2023 Fu .................. G06T 3/4046
                                                              382/254
2023/0230215 A1* 7/2023 Chen ............... H04N 9/64
                                                              382/162

OTHER PUBLICATIONS

"Sandler, MobileNetV2: Inverted Residuals_CVPR_2018_paper, 2018, Computer Vision Foundation, CVPR2018, all (4510-4520)" (Year: 2018).*

* cited by examiner

*Primary Examiner* — Rong Le
(74) *Attorney, Agent, or Firm* — Evergreen Valley Law Group; Kanika Radhakrishnan

(57) ABSTRACT

A system and method for enhancing video resolution is disclosed. A Low-Resolution (LR) video including a plurality of LR images is received. The LR video is converted to a High-Resolution (HR) video by transforming at least one LR image to a HR image. Pixel unshuffle is performed to rearrange image portions in the LR image to generate a set of downsampled sub-images. Further, shallow features are extracted from the set of downsampled sub-image. The shallow features extracted corresponding to the set of downsampled sub-images configure a feature space. The shallow features are processed using a series of inverted residual blocks to generate enhanced features corresponding to the set of downsampled sub-images. The enhanced features are mapped to a high resolution feature space using pixel shuffle to generate the HR image corresponding to the LR image.

20 Claims, 9 Drawing Sheets

SYSTEM AND METHOD FOR ENHANCING RESOLUTION OF VIDEO CONTENT

CROSS REFERENCE TO RELATED APPLICATIONS

Pursuant to 35 U.S.C. § 119(a), this application is entitled to and claims the benefit of the filing date of Indian Application No. 202221036484 filed Jun. 24, 2022 in India, entitled "SYSTEM AND METHOD FOR ENHANCING RESOLUTION OF VIDEO CONTENT", the content of which is incorporated herein by reference in its entirety for all purposes.

TECHNICAL FIELD

The present technology generally relates to the field of digital video processing and, more particularly, to a system and method for enhancing resolution of video content.

BACKGROUND

Digital content viewers generally prefer high resolution content over low resolution content as high resolution content offers superior image quality, which substantially enhances a content viewing experience of the content viewers. For example, high resolution video content typically includes image frames having clearer and better looking pictures, for example, image frames showing finer details in more vibrant colors. In some cases, the sharpness of out-of-focus content portions is also increased in high resolution content, thereby improving an overall quality of content viewing experience offered to a content viewer. As an example, image or video content captured at 300 dots per inch (dpi) or lower may be referred to as low-resolution content, whereas content captured at 300 dpi or higher may be referred to as high resolution content.

Many techniques are now available for converting content which is not originally captured at high resolution (i.e., low-resolution content) into high resolution content. One example of such a technique is video super-resolution, hereinafter referred to as VSR. The VSR methods mainly fall into two categories: traditional methods and deep learning based methods. The traditional methods utilize interpolation-based algorithms for expanding spatial dimension of the video content. While the interpolation-based algorithms are fast, their performance often results in noticeable artifacts and distortions. With the great success of deep learning, VSR algorithms based on deep learning are studied extensively. However, existing deep learning based methods introduce complex motion estimation and compensation modules to make efficient use of additional information from multiple frames. These modules increase the computational complexity and memory consumption, which impedes the real-time and low latency performance of video processing systems. Moreover, any errors in estimating motion may translate into reconstruction errors at a receiver side thereby adversely affecting quality of the video content.

Accordingly, there is a need for a real-time VSR solution which addresses the drawbacks of the current solutions. Further, it would be advantageous to enhance a resolution of the video content while reducing computational complexity and avoiding incorrect motion estimation.

SUMMARY

In an embodiment of the invention, a computer-implemented method for enhancing video resolution is disclosed. The method receives, by a video processing system, a Low-Resolution (LR) video. The LR video includes a plurality of LR images. The method converts, by the video processing system, the LR video to a High-Resolution (HR) video by transforming at least one LR image from among the plurality of LR images to a HR image. An LR image from among the at least one LR image is transformed to the HR image by performing the steps of: (1) performing pixel unshuffle to rearrange image portions in the LR image to generate a set of downsampled sub-images corresponding to the LR image, (2) extracting shallow features from the set of downsampled sub-images, wherein the shallow features extracted corresponding to the set of downsampled sub-images configure a feature space corresponding to the set of downsampled sub-images, (3) processing the shallow features using a series of inverted residual blocks to generate enhanced features corresponding to the set of downsampled sub-images, and (4) mapping the enhanced features to a high resolution feature space using pixel shuffle to generate the HR image corresponding to the LR image.

In an embodiment of the invention, a video processing system for enhancing video resolution is disclosed. The system includes a memory and a processor. The memory stores instructions, that when executed by the processor, cause the video processing system to receive a Low-Resolution (LR) video. The LR video includes a plurality of LR images. The video processing system converts the LR video to a High-Resolution (HR) video by transforming at least one LR image from among the plurality of LR images to a HR image. An LR image from among the at least one LR image is transformed to the HR image by performing the steps of: (1) performing pixel unshuffle to rearrange image portions in the LR image to generate a set of downsampled sub-images corresponding to the LR image, (2) extracting shallow features from the set of downsampled sub-images, wherein the shallow features extracted corresponding to the set of downsampled sub-images configure a feature space corresponding to the set of downsampled sub-images, (3) processing the shallow features using a series of inverted residual blocks to generate enhanced features corresponding to the set of downsampled sub-images, and (4) mapping the enhanced features to a high resolution feature space using pixel shuffle to generate the HR image corresponding to the LR image.

In another embodiment of the invention, a computer-implemented method for enhancing video resolution is disclosed. The method receives, by a video processing system, a Low-Resolution (LR) video in response to a playback request for streaming content provided by a content provider. The LR video includes a plurality of LR images. The method converts, by the video processing system, the LR video to a High-Resolution (HR) video in substantially real-time by transforming at least one LR image from among the plurality of LR images to a HR image. An LR image from among the at least one LR image is transformed to the HR image based on processing a set of downsampled sub-images configuring the LR image using a series of inverted residual blocks. The method includes facilitating, by the video processing system, display of the HR video on a display screen of an electronic device associated with a content viewer.

BRIEF DESCRIPTION OF THE FIGURES

The advantages and features of the invention will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 8. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

Figure 1:
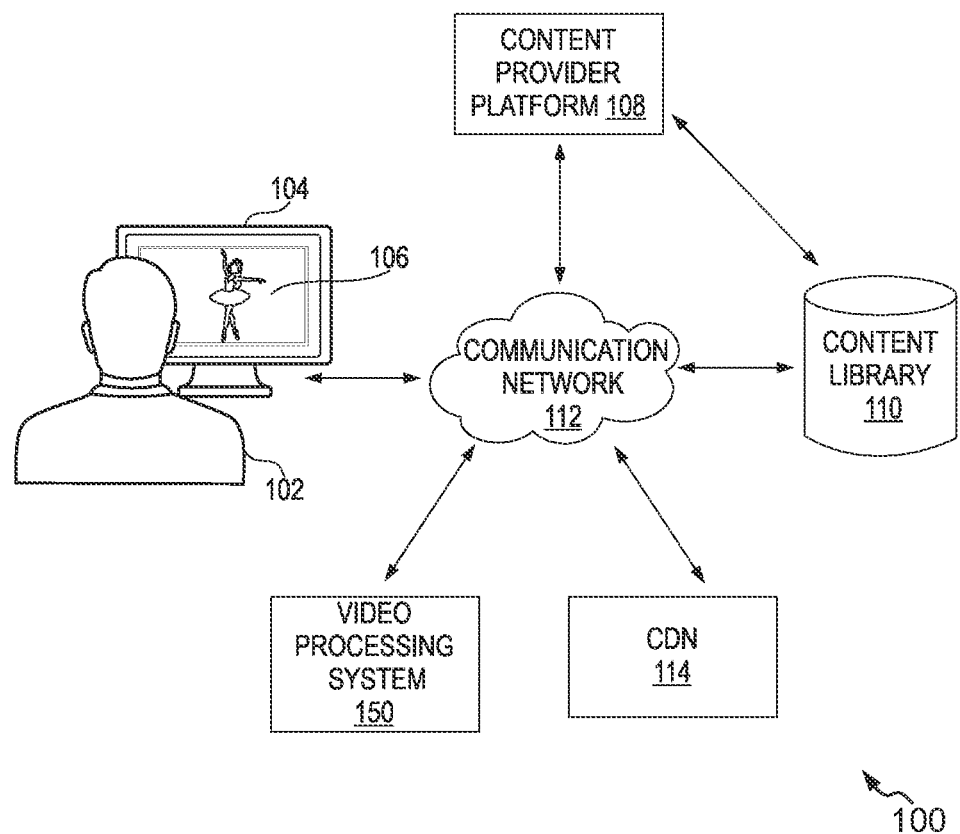
FIG. 1 is an example representation of an environment related to at least some example embodiments of the invention.

FIG. 1 is an example representation 100 of an environment related to at least some example embodiments of the invention.

It is noted that the representation 100 is shown to illustrate an example of video content viewed by a content viewer. Though the video content is mentioned to be provided by a content provider to the content viewer, it is understood that in some embodiments, the video content may be self-generated by the content viewer by using a personal device such as a camera embedded in a smartphone device or any such image capture device. Further, the video content may not necessarily be streaming content as mentioned hereinafter. Indeed, the video content, which is converted from a lower resolution to a higher resolution, may correspond to any sequence of image frames comprising multimedia content.

The representation 100 depicts a viewer 102 controlling an electronic device 104 for viewing/accessing media content offered by a streaming content provider.

The term 'streaming content provider' as used herein refers to an enterprise owner of digital video content libraries, which offers video content on subscription basis by using a digital platform and over-the-top (OTT) media services, i.e. the video content is streamed over the Internet to the electronic devices of the subscribers. A streaming content provider is hereinafter referred to as a 'content provider' for ease of description. Though a content provider is not shown in FIG. 1, a content provider platform 108 and a content library 110 associated with a content provider are shown in the representation 100 and explained in further detail later. The media content offered by the content provider may be embodied as streaming video content such as livestreaming content or on-demand video streaming content. Individuals accessing/viewing the content offered by the content provider are referred to herein as 'user', 'subscriber', 'content viewer' or simply as a 'viewer'.

The viewer 102 may have downloaded a software application (hereinafter referred to as an 'application' or an 'app') corresponding to the content provider on the electronic device 104. Though the electronic device 104 is depicted to be a television (TV), the electronic device 104 may be embodied as a smartphone, a laptop, a desktop, a personal computer or any spatial computing device capable of displaying video content offered by the content provider. One example video content being displayed on the electronic device 104 is shown as content 106.

The electronic device 104 may be configured to connect to a communication network, such as a communication network 112. The communication network 112 may correspond to the Internet enabled by an Internet Service Provider (ISP), also referred to herein as a network provider. The electronic device 104 may connect to the communication network 112 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like.

In one illustrative example, the viewer 102 may login into the application on the electronic device 104 to access content, such as a movie or a web series, offered by the content provider. On logging into the application, the viewer 102 may be presented with a User Interface (UI) associated with the application. The UI (not shown in FIG. 1) presents a large number of content items specifically arranged to make it easier for the viewer 102 to select a content item from among the number of content items for viewing purpose. For example, the UI may present a number of tiles (or thumbnail images) corresponding to content items specifically recommended for the viewer 102, a number of tiles corresponding to content items which are currently trending or popular among other content viewers, a number of tiles corresponding to top regional language content, and the like. Typically, the content provider platform 108 maintains a content catalog which includes a listing of all content items available with the content provider in the content library 110. For example, the content library 110 usually stores a wide variety of content, such as entertainment content, factual content, educational content, gaming content, lifestyle content, fitness content, travel content, and the like.

The viewer 102 may select a content title from among a plurality of content titles shown on the UI, which is displayed on the display screen of the electronic device 104. For example, the viewer 102 may select a content title related to a ballerina concert streamed from an event venue. The selection of the content title may trigger a request for a playback uniform resource locator (URL) to be sent from the electronic device 104 to the content provider platform 108 associated with the content provider. In response to the request for the playback URL, the content provider platform 108 is configured to determine the location of a nearest content delivery network (CDN) 114 caching the content corresponding to the requested content title. The content provider platform 108 is configured to generate the playback URL which includes the URL information of the CDN 114 and provide the playback URL to the electronic device 104. The electronic device 104 is then configured to use the playback URL provided by the content provider platform 108 to access the CDN 114 and request the content corresponding to the content title from the CDN 114, which may then stream the content, such as the content 106, to the electronic device 104 of the viewer 102.

Digital content viewers, such as the viewer 102, generally prefer high resolution content over low resolution content as high resolution content offers superior image quality, which substantially enhances a content viewing experience of the content viewers. Content which is not originally captured at high resolution (i.e., low-resolution content), on the other hand, may offer poor viewing experience to the viewer 102 due to poor quality of the images (for example, less clear images, less vibrant colors, and the like). Many techniques are now available for converting content which is not originally captured at high resolution (i.e., low-resolution content) into high resolution content. One example of such a technique is video super-resolution, hereinafter referred to as VSR. The VSR methods mainly fall into two categories: traditional methods and deep learning based methods. The traditional methods utilize interpolation-based algorithms for expanding spatial dimension of the video content. While the interpolation-based algorithms are fast, their performance often results in noticeable artifacts and distortions. With the great success of deep learning, VSR algorithms based on deep learning are studied extensively. However, existing deep learning based methods introduce complex motion estimation and compensation modules to make efficient use of additional information from multiple frames. These modules increase the computational complexity and memory consumption, which impedes the real-time and low latency performance of video processing systems. Moreover, any errors in estimating motion may translate into reconstruction errors at a receiver side thereby adversely affecting quality of the video content.

To overcome the aforementioned drawbacks and provide additional advantages, a video processing system is provided. The video processing system is shown as video processing system 150 in the representation 100 in FIG. 1. The video processing system 150 is configured to enhance resolution of video content, such as the content 106, while reducing computational complexity and avoiding incorrect motion estimation. Though the video processing system 150 is depicted to be a standalone system accessible over the communication network 112, it is noted that in at least some embodiments, the video processing system 150 may be incorporated within the electronic device 104 to facilitate conversion of the low resolution content received from a remote source, such as the CDN 114, into high resolution content. Alternatively, the video processing system 150 may be incorporated at the content provider's side, such as the content provider platform 108 or at the CDN 114, in which case, the content may be streamed at high resolution to the electronic device of the viewers, such as the electronic device 104 of the viewer 102. The video processing system 150 is explained in further detail with reference to FIG. 2.

Figure 2:
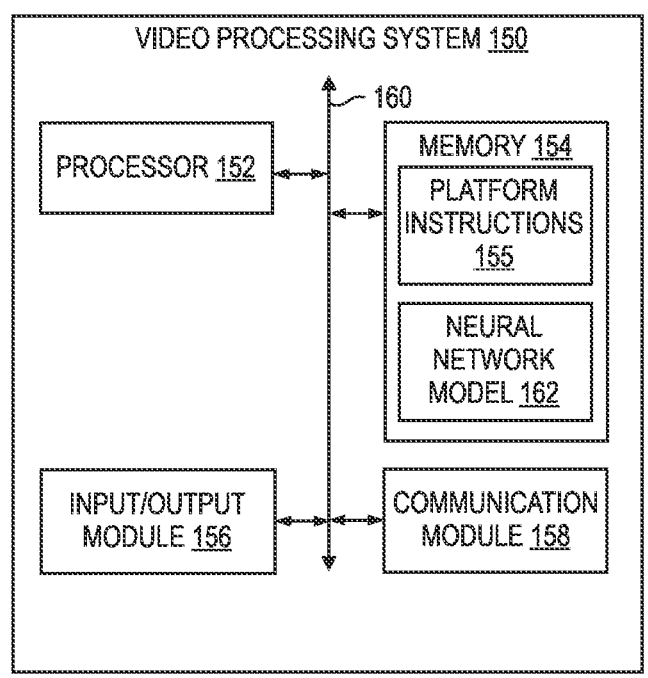
FIG. 2 is a block diagram of the system configured to enhance resolution of a video content, in accordance with an embodiment of the invention.

FIG. 2 is a block diagram of the video processing system 150 configured to enhance resolution of a video content, in accordance with an embodiment of the invention. As explained with reference to FIG. 1, the video processing system 150 may be implemented in a standalone server accessible over the communication network 112 (shown in FIG. 1). For example, the video processing system 150 may be implemented in one or more computing devices as part of a server entity and may be in operative communication with the content provider platform 108 (shown in FIG. 1). Alternatively, in at least one example embodiment, the video processing system 150 may be included within an electronic device associated with content viewers, such as, the electronic device 104 of the viewer 102. The video processing system 150 is hereinafter referred to as 'system 150'.

It is noted that the term 'enhance resolution of the video content' as used herein implies increasing the resolution, i.e., adding more pixels per inch, for representing the same detail in an image frame. For example, if an LR video content is captured at 480p, meaning the images (i.e., image frames) are at 480p resolution, then enhancing the resolution of the video content as used herein may imply increasing the resolution of at least one image frame configuring the LR video content from 480p to 720p or 1080p. The term 'video content' is hereinafter simply referred to as 'video'. In at least some embodiments, the resolution of each image within the LR video may be enhanced to configure the HR video from the LR video. Further, the term 'enhanced video content' as used herein primarily refers to high resolution video content. Such enhanced video content is capable of providing more details of an original scene in terms of pixel density, for example, edges, texture, abstract shapes, and thereby enhancing viewing experience for the viewers. In one illustrative example, video content with a resolution of 1080p (i.e., 1920×1080 pixels) may be upscaled to generate the enhanced video content of 4k pixels (i.e., 3840×2160 pixels).

The system 150 includes at least one processor such as a processor 152, and a memory 154. It is noted that although the system 150 is depicted to include only one processor, the system 150 may include more number of processors therein. In an embodiment, the memory 154 is capable of storing machine executable instructions, referred to herein as platform instructions 155. Further, the processor 152 is capable of executing the platform instructions 155. In an embodiment, the processor 152 may be embodied as a multi-core processor, a single core processor, or a combination of one or more multi-core processors and one or more single core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 154 stores logic and/or instructions, which may be used by the processor 152. For example, the memory 154 includes instructions for (1) performing pixel unshuffle to rearrange image portions in the LR image to generate a set of downsampled sub-images, (2) extracting shallow features from the set of downsampled sub-image, (3) processing the shallow features using a series of inverted residual blocks to generate enhanced features, and (4) mapping the enhanced features to a high resolution feature space using pixel shuffle to generate a HR image corresponding to the LR image. In at least some embodiments, the memory 154 may store at least one neural network (NN) model. The NN model is hereinafter simply referred to as neural network or 'NN'. The NN includes a plurality of layers such as the pixel unshuffle layer, one or more convolutional layers, an inverted residual layer, and a pixel shuffle layer. Each of the NN layers are configured to facilitate processing of image frames (also referred to hereinafter as 'images') for facilitating enhancement of video resolution of a low-resolution (LR) video to a high-resolution (HR) video. For example, the pixel unshuffle layer is configured to perform a pixel unshuffle of an LR image from the LR video to generate a set of downsampled sub-images. Similarly, a convolution layer is configured to extract shallow features from the set of downsampled sub-images. Accordingly, the memory 154 may include instructions for performing the image processing operations or may include a NN model 162 with layers trained to process the LR images to facilitate conversion of the LR video to a HR video. In an embodiment, the memory 154 includes one or more neural network (NN) models for generating the enhanced video content. For example, a neural network to upscale video content from 720p (i.e., 1280×720 pixels) to 4k (i.e., 4096×2160 pixels). In another illustrative example, a neural network may be deployed to convert video content with resolution of 1080p (i.e., 1920×1080 pixels) to 4k (i.e., 4096×2160 pixels).

The system 150 further includes an input/output module 156 (hereinafter referred to as an 'I/O module 156') and at least one communication module such as a communication module 158. In an embodiment, the I/O module 156 may include mechanisms configured to receive inputs from and provide outputs to the operator(s) of the system 150. For example, the parameters for training the NN may be provided as an input using the I/O module 156. In another example, the weights of the image patches of the HR image may be manually provided for computing the loss function and optimizing the trained NN. To that effect, the I/O module 156 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode (LED) display, a thin-film transistor (TFT) display, a liquid crystal display (LCD), an active-matrix organic light-emitting diode (AMOLED) display, a microphone, a speaker, a ringer, a vibrator, and the like. In an example embodiment, the processor 152 may include I/O circuitry configured to control at least some functions of one or more elements of the I/O module 156, such as, for example, a speaker, a microphone, a display, and/or the like. The processor 152 and/or the I/O circuitry may be configured to control one or more functions of the one or more elements of the I/O module 156 through computer program instructions, for example, software and/or firmware, stored on a memory, for example, the memory 154, and/or the like, accessible to the processor 152.

The communication module 158 may include communication circuitry such as for example, a transceiver circuitry including antenna and other communication media interfaces to connect to a communication network, such as the communication network 112 shown in FIG. 1. The communication circuitry may, in at least some example embodiments enable reception of LR video from remote entities, such as the content provider platform 108 (shown in FIG. 1). In some example embodiments, a video may include raw video feed being livestreamed from an event venue to content viewers. The communication circuitry may further be configured to enable transmission of enhanced video directly to the content viewers (e.g., the viewer 102).

The various components of the system 150, such as the processor 152, the memory 154, the I/O module 156, and the communication module 158 are configured to communicate with each other via or through a centralized circuit system 160. The centralized circuit system 160 may be various devices configured to, among other things, provide or enable communication between the components of the system 150. In certain embodiments, the centralized circuit system 160 may be a central printed circuit board (PCB) such as a motherboard, a main board, a system board, or a logic board. The centralized circuit system 160 may also, or alternatively, include other printed circuit assemblies (PCAs) or communication channel media.

In at least one example embodiment, the communication module 158 is configured to receive a low-resolution (LR) video from a remote source, such as a CDN 114 (shown in FIG. 1). The LR video may be provided by the CDN 114 in response to a playback request for streaming content to the viewer 102 (shown in FIG. 1) by the content provider platform 108. The LR video includes a sequence of a plurality of LR images. The streaming content may correspond to a livestreaming content or video-on-demand content. In one embodiment, the LR video may correspond to a video captured at low-resolution by the viewer 102 using the electronic device 104 (shown in FIG. 1). Alternatively, the LR video may be received from any other image capture device. The communication module 158 may be configured to forward the LR images corresponding to the LR video to the processor 152. In at least one embodiment, the LR images may be forwarded on a frame-by-frame basis in a sequence to the processor 152. The processor 152 in conjunction with the instructions stored in the memory 154 is configured to process the LR images to generate the HR video. The processing performed by the processor 152 is explained next with reference to FIG. 3.

Figure 3:
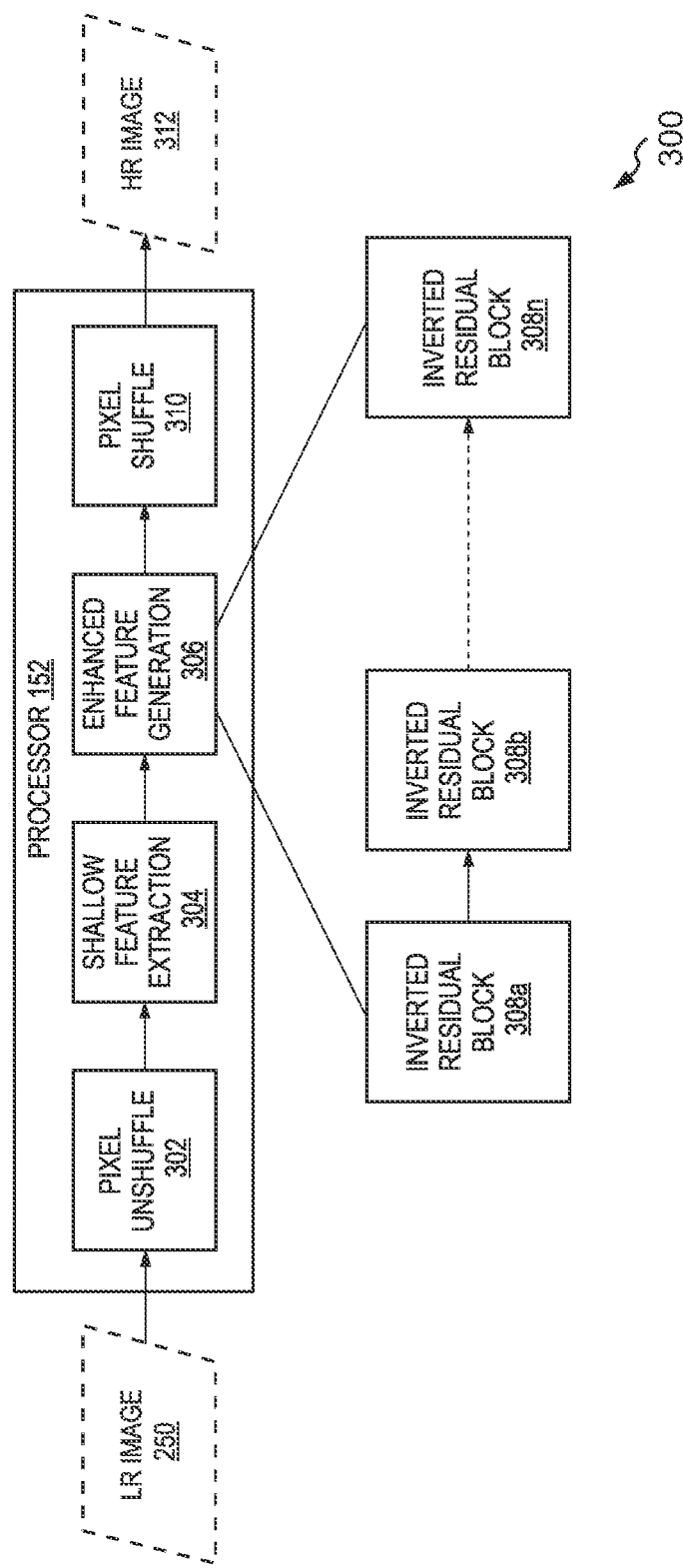
FIG. 3 is a representation for illustrating processing performed by the processor of FIG. 1 for converting a LR video to a HR video, in accordance with an embodiment of the invention.

FIG. 3 is a representation 300 for illustrating processing performed by the processor 152 of FIG. 1 for converting the LR video to the HR video, in accordance with an embodiment of the invention. As explained with reference to FIG. 1, the system 150 is configured to receive the LR video, i.e., the low-resolution video via the communication module 158 and forward the LR video to the processor 152. The LR video may correspond to livestreamed content from an event site, a video-on-demand (VOD) streamed content, a self-captured video clip or a pre-recorded video (e.g., an old movie, a vlog, an advertisement, an educational video, etc.). In some embodiments, the LR video may be provided to the processor 152 on a frame-by-frame basis or, alternatively, the entire sequence of the plurality of images configuring the LR video may be provided to the processor 152. To enhance resolution of the LR video, the processor 152 is configured to convert the LR video to the HR video. To convert the LR video to the HR video, the processor 152 is configured to transform at least one LR image from among the plurality of LR images in the LR video to a HR image. The transformation of one LR image to an HR image is explained hereinafter. It is understood that more than one LR image may be sequentially transformed to HR images to convert the LR video to the HR video.

Accordingly, an LR image 250 is depicted to be provided to the processor 152. The processor 152 is configured to perform various processing operations on the LR image 250 such as pixel unshuffle 302, shallow feature extraction 304, enhanced feature generation 306 and pixel shuffle 310. It is noted that in at least some embodiments, the processor 152 is configured to utilize the NN model 162 stored in the memory 154 for executing the various processing operations. The NN model 162 includes a plurality of layers such as a pixel unshuffle layer, one or more convolutional layers, an inverted residual layer, and a pixel shuffle layer. In at least some embodiments, the pixel unshuffle layer may facilitate processing of the pixel unshuffle 302 operation. Similarly, a convolution layer from among the one or more convolution layers may facilitate processing of the shallow feature extraction 304 operation. The inverted residual layer may facilitate processing of the enhanced feature generation 306 operation, whereas the pixel shuffle layer may facilitate processing of the pixel shuffle 308 operation.

As part of the pixel unshuffle 302, the processor 152 is configured to rearrange image portions in the LR image 250 to generate a set of downsampled sub-images. The term 'image portion' as used herein refers to an area of predefined size in the LR image 250. In general, each image portion refers to a block of pixels from the LR image 250. In some embodiments, the image portions may be related to at least a portion of a channel, such as a color channel. The generation of the set of downsampled sub-images using pixel unshuffle 302 is further explained next with reference to FIG. 4.

Figure 4:
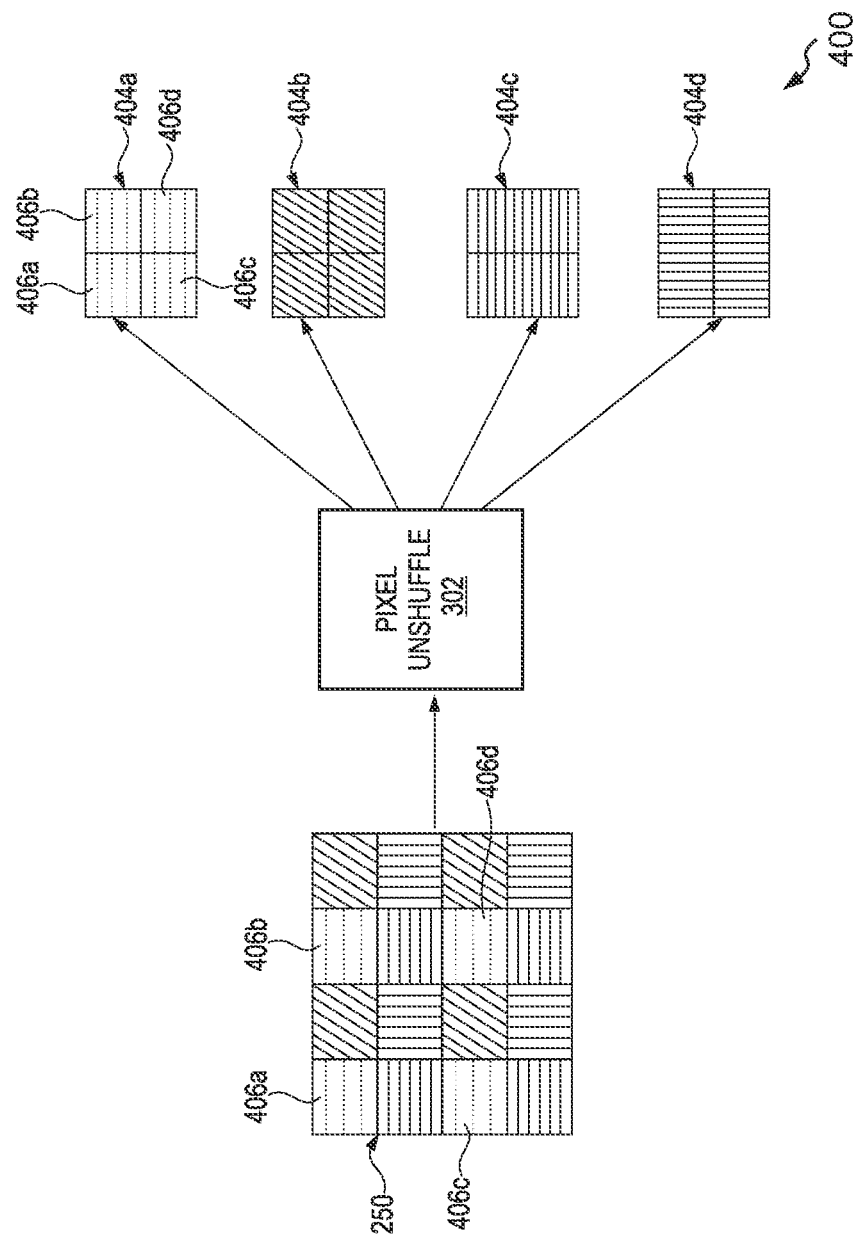
FIG. 4 depicts a representation for illustrating a generation of the set of downsampled sub-images using the pixel unshuffle operation of FIG. 3, in accordance with an example embodiment.

FIG. 4 depicts a representation 400 for illustrating a generation of the set of downsampled sub-images using the pixel unshuffle 302 operation of FIG. 3, in accordance with an embodiment of the present invention. As explained with reference to FIG. 3, as part of the pixel unshuffle 302, the processor 152 is configured to rearrange image portions in the LR image 250 to generate a set of downsampled sub-images.

In one embodiment, the pixel unshuffle layer of the NN model 162 is configured to transform the LR image 250 from spatial representation to channel based representation to decrease the horizontal and vertical pixel count of the LR image 250. Accordingly, each downsampled sub-image corresponds to a channel in the LR image 250. For example, if an LR image 250 is represented by C×sH×sW, where 'C' corresponds to the color channels in the LR image 250, 'sH' represents the height of the LR image 250, 'sW' represents the width of the LR image 250, then the pixel unshuffle 302 operation is configured to generate $s^2$ downsampled sub-images of C×H×W size, where s corresponds to an upscaling factor, i.e., the spatial dimensions are reduced by a factor 's'. In FIG. 4, the value of 's' corresponds to 2 and C, H and W are 1, 2 and 2, respectively i.e., the image portions of the LR image 250 are rearranged to generate '$s^2$' or '4' downsampled sub-images with size 1×2×2 from the LR image 250. Accordingly, in the representation 400, the LR image 250 is spatially reduced to generate the set of four downsampled sub-images.

The set of downsampled sub-images shown as 404a, 404b, 404c and 404d are also hereinafter referred to as a sub-image 1, a sub-image 2, a sub-image 3, and a sub-image 4, respectively. The pixel unshuffle of the LR image 250 rearranges the image portions of the LR image 250 and as such, image portion arrangements of each downsampled sub-image is shown with reference to sub-images 404a, 404b, 404c and 404d for illustration purposes in FIG. 4. For example, image portions 406a, 406b, 406c and 406d of the LR image 250 are rearranged to generate the downsampled sub-image 404a. Similarly, other image portions in the LR image 250 are rearranged to generate the downsampled sub-images 404b, 404c and 404d as shown in FIG. 4.

The transformation of the LR image 250 into the set of downsampled sub-images (i.e., $s^2$ sub-images) helps in retaining all pixel related information of the LR image 250 but reduces the computational complexity required to process the LR image 250 through dimensionality reduction. The set of downsampled sub-images 404a, 404b, 404c and 404d with reduced spatial dimensions are further processed to extract features as will be explained in further detail hereinafter.

Referring back to FIG. 3, the processor 152 is configured to perform a shallow feature extraction 304 in relation to the set of downsampled sub-images. The term 'features' as used herein refers to parts or patterns of an object in an image that help to identify the object. For example, a square shaped object is associated with four corners and four edges. The corners and the edges of the square enable a user to identify the object as a square. In one embodiment, the processor 152 is configured to use one or more convolutional layers to extract 'shallow features', i.e., local low-level features which can be discerned with less complexity and processing power (such as corners of a square shaped object for example). To this effect, each convolutional layer in the NN model 162 is associated with a filter configured to scan the set of downsampled sub-images with a 3×3 kernel, which is associated with a kernel function configured to facilitate shallow feature extraction. The shallow features extracted in relation to the set of downsampled sub-images constitute a feature space which is processed to facilitate generation of an enhanced feature space as will be explained hereinafter.

The processor 152 is further configured to perform an enhanced feature generation 306 in relation to the extracted shallow features. As explained above, an inverted residual layer of the NN model 162 may facilitate processing of the enhanced feature generation 306 operation. The inverted residual layer of the NN model 162 is configured to generate enhanced features corresponding to the set of downsampled sub-images. To this effect, the shallow features are gradually modified in the feature space by a series of inverted residual blocks 308a, 308b, ..., 308n. For example, an inverted residual block such as, the inverted residual block 308a is configured to determine information present in image portions in form of low-level features to recover and restore missing high resolution data such as, sharp edges, contours, lines, etc. In one illustrative example, for an LR image of a butterfly moving amidst a garden of flowers, the shallow feature extraction 304 may result in extraction of objects such as a butterfly with wings in a garden, whereas the enhanced feature generation 306 using the inverted residual blocks may restore the contours of the wings of the butterfly from the information that is determined from spatial correlations in the feature space. An example processing performed by an inverted residual block for restoring high resolution data in an image portion of an LR image is explained next with reference to FIG. 5.

Figure 5:
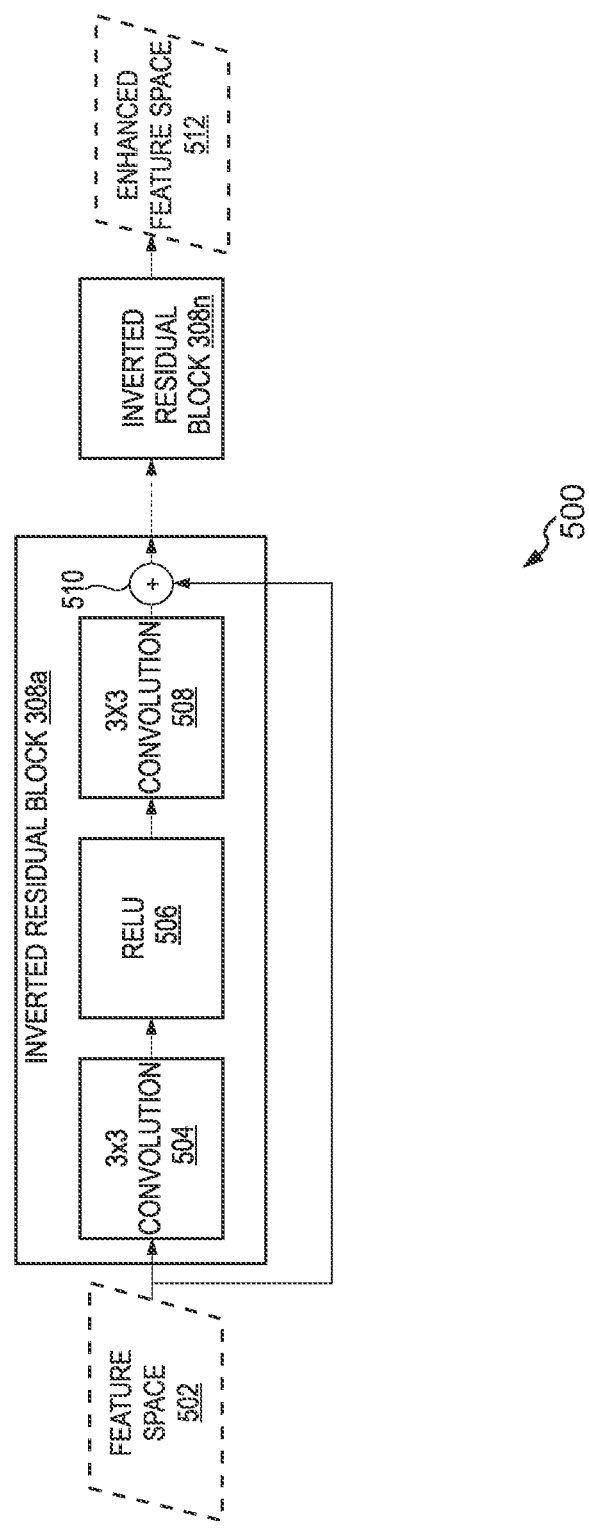
FIG. 5 shows a block diagram of an inverted residual block for illustrating processing of a feature space by the inverted residual block for generating an enhanced feature space in accordance with an example embodiment of the invention.

Referring now to FIG. 5, a block diagram 500 is shown for illustrating processing of a feature space 502 by the inverted residual block 308a for generating an enhanced feature space 512 in accordance with an example embodiment of the invention.

As already explained with reference to FIGS. 2 to 4, the shallow features extracted in relation to the set of downsampled sub-images constitute a feature space, such as the feature space 502, which is received by the series of inverted residual blocks 308a, 308b, ..., 308n. The feature space 502 is processed to facilitate generation of the enhanced feature space as will be explained with reference to the inverted residual block 308a. The processing steps executed by the inverted residual block 308a are explained hereinafter.

The inverted residual block 308a receives the feature space (shown as feature space 502 in FIG. 5) of the LR image 250 (shown in FIG. 3). The feature space 502 includes the shallow features extracted from the set of downsampled sub-images. The feature space 502 is a low dimensional representation of the set of downsampled sub-images which is expanded by an expansion factor (e.g., expansion factor of 2) using convolution to generate the enhanced feature space 512. In general, each inverted residual block employs convolution filters that operate on the shallow features (i.e., low-level features) to extract complex features that are combinations of shallow features such as, complex features depicting multiple lines to express shapes from the LR image 250 which are gradually expanded by the convolution. Such process is performed by each inverted residual block in the series of inverted residual blocks 308a, 308b, ..., 308n to generate the enhanced features which depict complex objects of the LR image 250, such as faces, animals, etc.

At 504, the inverted residual block 308a performs a first convolution to transform the feature space 502 corresponding to the shallow features from a low-dimensional feature space 502 to a high dimensional feature space. More specifically, the first convolution expands the shallow features (2×) in the feature space 502 for generating the high-dimensional feature space. As such, the first convolution extracts complex features that are combinations of shallow features such as, combinations of multiple lines to express shapes from the LR image 250. In an embodiment, convolutional filters with dimensions of 3×3 are applied on the feature space 502 to generate the high dimensional feature space. For example, 32 channels in the feature space 502 are transformed to 64 channels in the high-dimensional feature space.

At 506, a ReLu activation function (i.e., REctified Linear activation Unit) is applied to output of the first convolution i.e., to the high-dimensional feature space. The ReLU activation function is a piecewise linear function that ensures the NN model 162 learns complex relationships in the high-dimensional feature space. In general, the ReLU will output the input directly if it is positive, otherwise, it will output zero.

At 508, the inverted residual block 308a performs a second convolution for extracting more complex features from the shallow features in the high-dimensional feature space. More specifically, the second convolution may be applied to the output of the ReLU activation function to generate more complex features which are combination of complex features extracted by the first convolution. For example, the second convolution determines combination of lines (i.e., features depicting lines extracted by the first convolution) to generate more complex features.

At 510, complex features generated after performing the first convolution and the second convolution are combined with the shallow features to generate high-level features.

The generation of the high-level features is explained in reference with one inverted residual block 308a and the same processing steps may be repeated by other inverted residual blocks in the series of inverted residual blocks 308a, 308b, ... 308n to generate the enhanced space 512. Finally, the series of inverted residual blocks 308a, 308b, ... 308n generate the enhanced feature space 512. In general, the series of inverted residual blocks 308a, 308b, ... 308n generate the enhanced feature space 512 by abstraction of shallow features from low to higher orders. The enhanced feature space 512 includes the enhanced features corresponding to the set of downsampled sub-images.

Referring now to FIG. 3, a pixel shuffle 310 is performed to transform or map the enhanced features from the enhanced feature space (i.e., the enhanced feature space 512) to a high resolution feature space. Accordingly, the enhanced feature space including the enhanced features corresponding to the set of downsampled sub-images are processed using sub-pixel convolution to convert the enhanced feature space to a high resolution feature space for increasing pixel density. More specifically, all enhanced features in the enhanced feature space are rearranged and mapped to a higher dimensional feature space for generating the HR image 312 corresponding to the LR image 250. In general terms, the enhanced feature space including enhanced features from the set of downsampled sub-images are combined together using sub-pixel convolution to generate the HR image 312. Such HR image 312 may be displayed on display screen of electronic devices with higher resolution, such as 4K with image quality similar to that of rendering image quality natively in a higher resolution. Further, more than one LR image in the LR video may be converted to higher resolution to generate the HR video. In at least some embodiments, the conversion of the LR video to the HR video is performed in substantially real-time in relation to a playback request for streaming content corresponding to the LR video. Further, the processor 152 of the video processing system 150 (i.e., system 150) is configured to provide the HR images (and/or HR video) to the communication module 158 to facilitate display of the HR video in relation to the playback request for streaming content corresponding to the LR video, where the HR video is displayed on a display screen of an electronic device associated with a content viewer. Although, high quality of video is provided to viewers for providing a seamless experience, the system 150 performs most of the computation on the set of downsampled sub-images thereby providing significant computational and memory savings.

In at least some embodiments, during the training phase, the NN model 162 may be trained to learn the underlying picture complexity. To that effect, the NN model 162 may be configured to decompose the HR image into a plurality of image patches. The term 'image patch' as used herein refers to an area of predefined size in the HR image 312. In general, each image patch refers to a block of pixels from the HR image 312. For example, the HR image 312 may be decomposed into $k_1*k_2$ image patches where $k_1$ and $k_2$ are positive integers. Further, a weight of each image patch is determined by computing a standard deviation of the weights assigned to the sub-patch portions configuring the respective image patch. In at least one embodiment, the weight is indicative of a super resolution restoration difficulty associated with a respective image patch.

The weights associated with respective image patches are used to compute a loss function. The computed loss function is used to optimize the NN model 162. The optimized NN model 162 facilitates future inference processing of LR images to generate the HR image in a straightforward manner. In some embodiments, the optimized NN model 162 may also enable determination of how much effort to expend, or in other words, how many iterations to perform when processing the shallow features to generate the corresponding enhanced features. For example, if the optimized NN model 162 predicts, based on the shallow feature extraction, that a particular image portion is associated with high restoration difficulty (i.e., higher weight), then the NN model 162 may only expend a moderate effort in generating enhanced features as compared to an image portion which is associated with lower restoration difficulty prediction (i.e., lower weight). Since the restoration difficulty is high, several iterations of processing of shallow features via the inverted residual blocks may still yield average results, accordingly, only moderate processing is performed for such image portions (i.e., image portions predicted to be associated with high restoration difficulty) to reduce the latency. Such an optimized NN model 162, which is configured to perform appropriate amount of processing of the image portions based on the underlying restoration complexity keeps latency in check, which in turn enables real-time applications, such as performing conversion of LR video to HR video in response to a content playback request. An example determination of the weight of an image patch is explained with reference to FIG. 6.

Figure 6A:
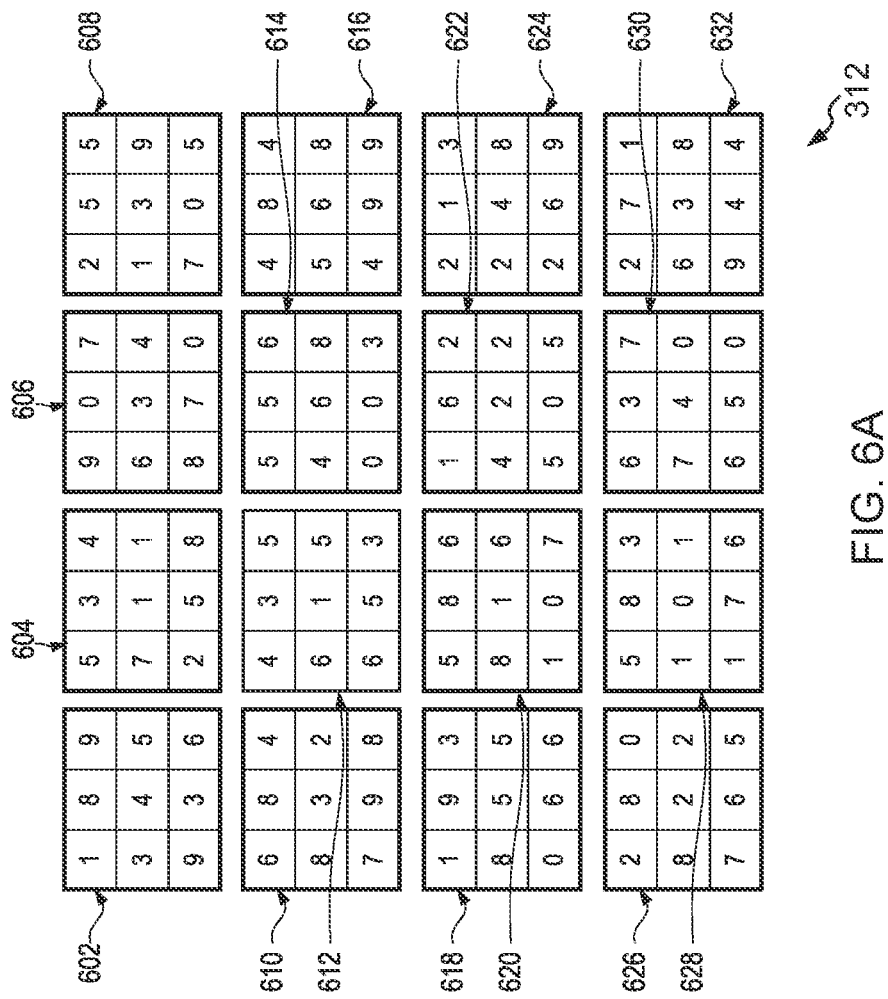
FIGS. 6A-6B show representations of the HR image for illustrating a processing of the HR image for optimizing the NN model, in accordance with an embodiment of the invention.
Figure 6B:
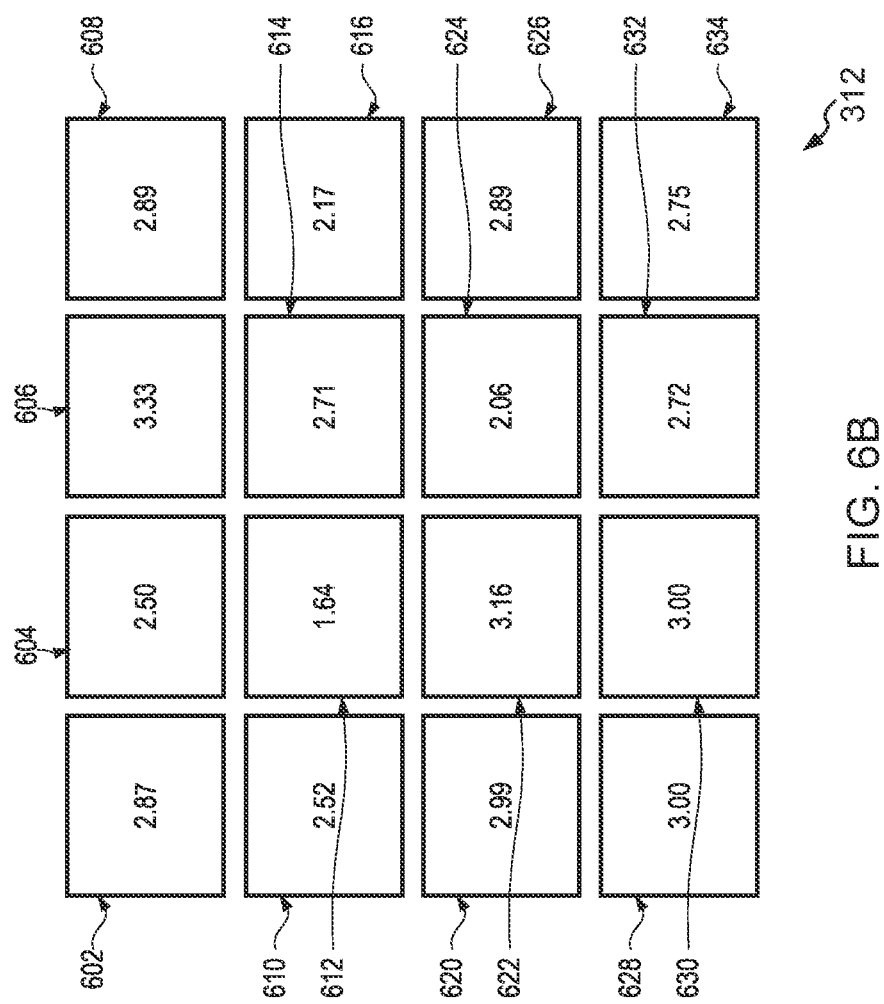

FIGS. 6A-6B show representations of the HR image 312 for illustrating a processing of the HR image 312 for optimizing the NN model 162 (shown in FIG. 2), in accordance with an embodiment of the invention.

It is noted that different parts in a HR image may have different sensitivity to video super resolution. For example, some parts of the HR image may include ambiguous data, such as moving objects for example. Such parts are complex to restore and are relatively less important, when it comes to restoring finer details (i.e., high resolution version) of the underlying image components. However, it is necessary to restore finer details of parts of the HR image having complex textures than the ambiguous areas while enhancing the resolution of the LR image. To that effect, a trained neural network such as the NN model 162 is further optimized to predict super resolution restoration difficulty in relation to various parts of an LR image under processing and, accordingly perform appropriate processing of the shallow features via the series of inverted residual blocks to generate the enhanced features. The optimization of the trained NN model 162 is explained with reference to processing of the HR image 312. It is understood that several HR images, such as the HR image 312, may be similarly processed to facilitate optimization of the NN model 162.

In FIG. 6A, the HR image 312 is decomposed into a plurality of image patches. For example, the HR image 312 may be decomposed into $k_1*k_2$ image patches where $k_1$ and $k_2$ are positive integers. In FIG. 4, the values of k1 and k2 are chosen to 4 each. Accordingly, the HR image 312 is decomposed into 16 image patches, shown as 602, 604, 606, 608, 610, 612, 614, 616, 618, 620, 622, 624, 626, 628, 630 and 632. Each image patch may be composed of a number of sub-patch portions. For example, each image patch is depicted to include nine sub-patch portions (shown as square blocks in FIG. 6A). Further, each sub-patch portion is assigned a weight based on the underlying complexity of the sub-patch portion. In one illustrative example, if a sub-patch portion includes a blurred motion component, then a low weight may be assigned to the corresponding sub-patch portion. Alternatively, if a sub-patch portion does not include any motion, or motion which can be delineated with image processing then a relatively high weight may be assigned to the sub-patch portion. In another illustrative example, if the sub-patch portion includes a flat area, such as sky or land, then a low weight may be assigned to the corresponding sub-patch portion. Alternatively, if the image patch includes complex textures (e.g., hair, feathers), then a high weight may be assigned to that sub-patch portion. As an example, sub-patch portion 602a is assigned a weight of '9' while another sub-patch portion 602b is assigned a weight of '1'. In one embodiment, the weight of an image patch is determined by computing a standard deviation of the weights assigned to the sub-patch portions configuring the respective image patch. For example, a standard deviation of weights 1, 8, 9, 3, 4, 5, 9, 3 and 6 is computed to determine the weight of the image patch 602 as 2.872.

FIG. 6B shows the image patches of the HR image 312 with corresponding weight marked on the image patch for illustration purpose. For example, the image patch 602 is depicted to be associated with the weight 2.872 in FIG. 6B. Similarly, weights of image patches 604, 606, 608, 610, 612, 614, 616, 618, 620, 622, 624, 626, 628, 630 and 632 are shown as 2.5, 3.333, 2.89, 2.522, 1.641, 2.713, 2.179, 2.990, 3.162, 2.061, 2.891, 3.00, 3.00, 2.72 and 2.75, respectively. In at least one embodiment, the weight is indicative of a super resolution restoration difficulty associated with a respective image patch. Accordingly, an image patch 612 with weight 1.641 may relatively be easier to restore from a video super resolution perspective, as compared to the image patch 620, which is associated with weight 3.162.

The weights associated with respective image patches are used to compute a loss function. The computed loss function is used to optimize the NN model 162. In one embodiment, the loss function is formulated as shown by Equation (1):

$$L(\theta) = \frac{1}{N}\sum_{i=0}^{N} W_i \left\| f_{SR}(I_{LR}^i) - (I_{HR}^i) \right\|$$ Equation (1)

where θ denotes parameters of the neural network $f_{SR}$, N is the number of training samples, $W_i$ is the computed weight according to i-th image patch, $I_{LR}^i$ and $I_{HR}^i$ denote the i-th image patch and corresponding ground truth.

In one embodiment, the weight is a re-scalable value that is adapted during the training of the NN model 162 for fine tuning parameters of the NN model 162. The weight values assigned to the each sub-patch portion is adapted based on the loss function (shown as Equation (1)). In an example representation, a lower weight values assigned to sub-patch portions corresponding to the background. Because the background region has less texture, it does not require much attention. On the contrary, weight values of sub-patch portions corresponding to a flower, for example, edges of flower petals or shape of flower petals are assigned a higher value to restore features corresponding to the flower in an LR image. As such, the NN model 162 is trained to generate HR images in which image portions corresponding to the flower are enhanced with more details when compared with image portions corresponding to the butterfly. A method for enhancing a resolution of video content is explained next with reference to FIG. 7.

Figure 7:
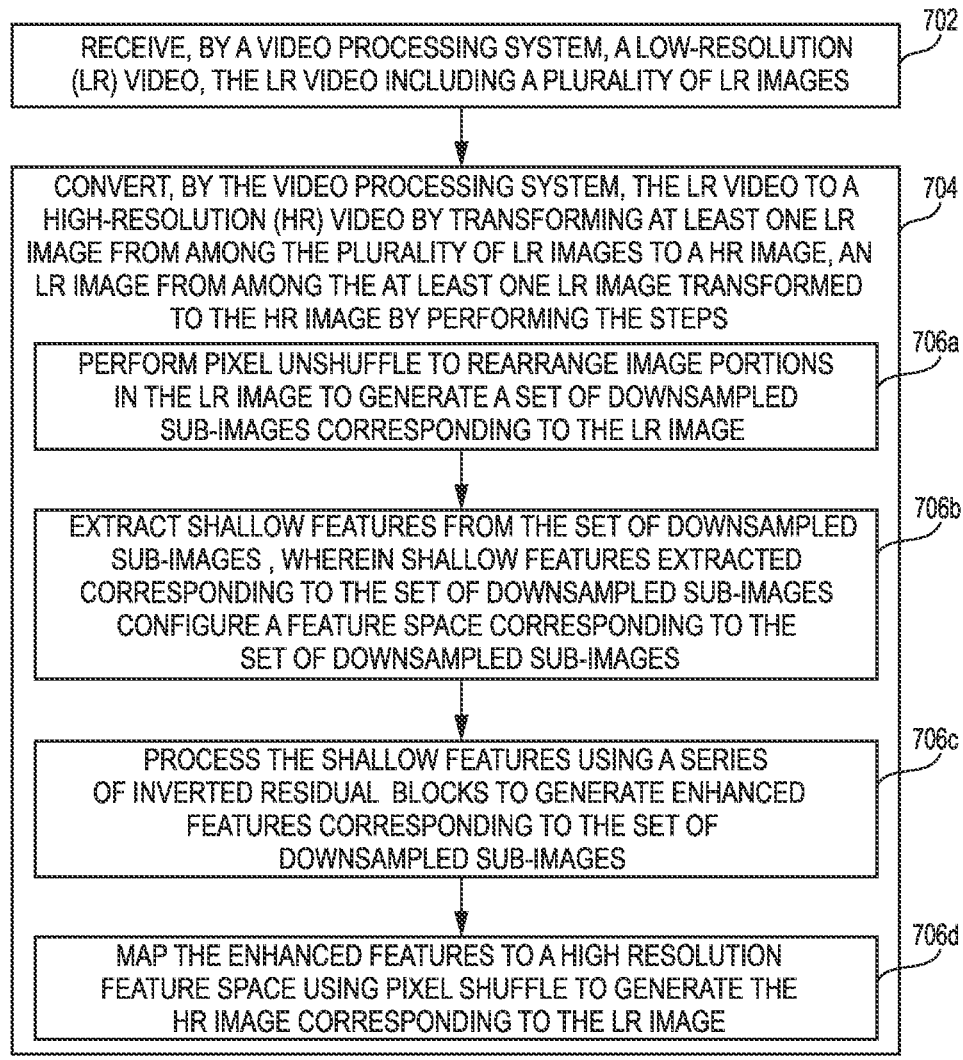
FIG. 7 shows a flow diagram of a method for enhancing resolution of a video content, in accordance with an embodiment of the invention.

FIG. 7 shows a flow diagram of a method 700 for enhancing resolution of a video content, in accordance with an embodiment of the invention. The various steps and/or operations of the flow diagram, and combinations of steps/operations in the flow diagram, may be implemented by, for example, hardware, firmware, a processor, circuitry and/or by a video processing system such as the system 150 explained with reference to FIGS. 1 to 6B and/or by a different device associated with the execution of software that includes one or more computer program instructions. The method 700 starts at operation 702.

At operation 702 of the method 700, a Low-Resolution (LR) video is received by a system, such as the video processing system 150. The LR video may be received from a remote source, such as a CDN 114 shown in FIG. 1. The LR video may be provided by the CDN 114 in response to a playback request for streaming content to a viewer 102 from the content provider platform 108 (shown in FIG. 1). The LR video includes a sequence of a plurality of LR images. The streaming content may correspond to a livestreaming content or video-on-demand content. In one embodiment, the LR video may correspond to a video captured at low-resolution by the viewer using an electronic device. Alternatively, the LR video may be received by the system 150 from any other image capture device.

At operation 704 of the method 700, the LR video is converted to a High-Resolution (HR) video by transforming at least one LR image from among the plurality of LR images to a HR image. The video processing system may perform various processing operations on the LR image such as pixel unshuffle, shallow feature extraction, enhanced feature generation and pixel shuffle. In one embodiment, the video processing system implements a neural network (NN) for facilitating conversion of the LR video to the HR video. The NN includes a plurality of layers such a pixel unshuffle layer, one or more convolutional layers, an inverted residual layer, and a pixel shuffle layer. In at least some embodiments, the pixel unshuffle layer may facilitate processing of the pixel unshuffle operation. Similarly, a convolution layer from among the one or more convolution layers may facilitate processing of the shallow feature extraction operation. The inverted residual layer may facilitate processing of the enhanced feature generation operation, whereas the pixel unshuffle layer may facilitate processing of the pixel shuffle operation. An LR image from among the at least one LR image is transformed to the HR image by performing the steps 706a, 706b, 706c and 706d.

At operation 706a of the method 700, pixel unshuffle is performed to rearrange image portions in the LR image to generate a set of downsampled sub-images corresponding to the LR image. The term 'image portion' as used herein refers to an area of predefined size in the LR image. In one embodiment, as part of the pixel unshuffle operation, a reversible downsampling is performed on the LR image to segment the LR image into the set of downsampled sub-images. In general, each image portion refers to a block of pixels from the LR image. In one embodiment, each downsampled sub-image corresponds to a channel in the LR image. For example, if an LR image is represented by C×sH×sW, where 'C' corresponds to the color channels in the LR image, 'sH' represents the height of the LR image, 'sW' represents the width of the LR image, then the pixel unshuffle operation is configured to generate $s^2$ downsampled sub-images of C×H×W size, where s corresponds to an upscaling factor, i.e., the spatial dimensions are reduced by a factor 's'

At operation 706b of the method 700, shallow features are extracted from the set of downsampled sub-images. The term 'features' as used herein refers to parts or patterns of an object in an image that help to identify the object. For example, a square shaped object is associated with four corners and four edges. The corners and the edges of the square enable a user to identify the object as a square and are referred to as features of the square. In one embodiment, the video processing system is configured to use one or more convolutional layers to extract 'shallow features', i.e., local low-level features which can be discerned with less complexity and processing power (such as corners of a square shaped object for example). To this effect, each convolutional layer in the NN model is associated with a filter configured to scan the set of downsampled images with a 3×3 kernel, which is associated with a kernel function configured to facilitate shallow feature extraction. The shallow features extracted corresponding to the set of downsampled sub-images configure a feature space corresponding to the set of downsampled sub-images.

At operation 706c of the method 700, the shallow features are processed using a series of inverted residual blocks to generate enhanced features corresponding to the set of downsampled sub-images. Further, each inverted residual block of the series of inverted residual blocks is configured to expand the at least one shallow feature from among the shallow features by an expansion factor to generate the enhanced features. To this effect, the shallow features are gradually modified in the feature space by a series of inverted residual blocks, such as the series of inverted residual blocks 308a, 308b, . . . , 308n shown in FIG. 3. For example, an inverted residual block such as, the inverted residual block 308a is configured to determine information present in image portions in form of low-level features to recover and restore missing high resolution data such as, sharp edges, contours, lines, etc. In one illustrative example, for an LR image of a butterfly moving amidst a garden of flowers, the shallow feature extraction may result in extraction of objects such as a butterfly with wings in a garden, whereas the enhanced feature generation using the inverted residual blocks may restore the contours of the wings of the butterfly from the information that is determined from spatial correlations in the feature space.

In one embodiment, an inverted residual block performs a first convolution to transform the feature space corresponding to the shallow features from a low-dimensional feature space to a high dimensional feature space. More specifically, the first convolution expands the shallow features (2×) in the feature space for generating the high-dimensional feature space. As such, the first convolution extracts complex features that are combinations of shallow features such as, combinations of multiple lines to express shapes from the LR image. In an embodiment, convolutional filters with dimensions of 3×3 are applied on the feature space to generate the high dimensional feature space. For example, 32 channels in the feature space are transformed to 64 channels in the high-dimensional feature space. A ReLU activation function (i.e., REctified Linear activation Unit) is applied to output of the first convolution i.e., to the high-dimensional feature space. The ReLU activation function is a piecewise linear function that ensures the NN model learns complex relationships in the high-dimensional feature space. In general, the ReLU will output the input directly if it is positive, otherwise, it will output zero. Subsequently, the inverted residual block performs a second convolution for extracting more complex features from the shallow features in the high-dimensional feature space. More specifically, the second convolution is applied to output of the ReLU activation function to generate more complex features which are combination of complex features extracted by the first convolution. For example, the second convolution determines combination of lines (i.e., features depicting lines extracted by the first convolution) to generate more complex features. The high-level features generated after performing the first convolution and the second convolution are combined with the shallow features to generate the enhanced features. The generation of the enhanced features may be performed as explained with reference to FIG. 5

At operation 706d of the method 700, the enhanced features are mapped to a high resolution feature space using pixel shuffle to generate the HR image corresponding to the LR image. Accordingly, the enhanced feature space including the enhanced features corresponding to the set of downsampled sub-images are processed using sub-pixel convolution to convert the enhanced feature space to a high resolution feature space for increasing pixel density. More specifically, all enhanced features in the enhanced feature space are rearranged and mapped to a higher dimensional feature space for generating the HR image corresponding to the LR image. In general terms, the enhanced feature space including enhanced features from the set of downsampled sub-image are combined together using sub-pixel convolution to generate the HR image. The conversion of the LR video to the HR video is performed in substantially real-time in relation to a playback request for streaming content corresponding to the LR video. In one embodiment, display of the HR video is facilitated in relation to the playback request for streaming content corresponding to the LR video, where the HR video is displayed on a display screen of an electronic device, such as 4K with image quality similar to that of rendering image quality natively in a higher resolution. Further, more than one LR image in the LR video may be converted to higher resolution to generate the HR video.

In at least some embodiments, a NN model may be trained to learn the underlying picture complexity of each image portion of an LR image. To that effect, the NN model may be configured to decompose the HR image into a plurality of image patches. The term 'image patch' as used herein refers to an area of predefined size in the HR image. In general, each image patch refers to a block of pixels from the HR image. For example, the HR image may be decomposed into $k_1*k_2$ image patches where $k_1$ and $k_2$ are positive integers. Further, a weight of each image patch is determined by computing a standard deviation of the weights assigned to the sub-patch portions configuring the respective image patch. The assignment of the weights to the sub-patch portion and the subsequent determination of the weight of each image patch may be performed as explained with reference to FIGS. 6A-6B and is not explained again herein.

The weights associated with respective image patches are used to compute a loss function. The computed loss function is used to optimize the NN model. The optimized NN model 162 facilitates future inference processing of LR images to generate the HR image in a straightforward manner.

Figure 8:
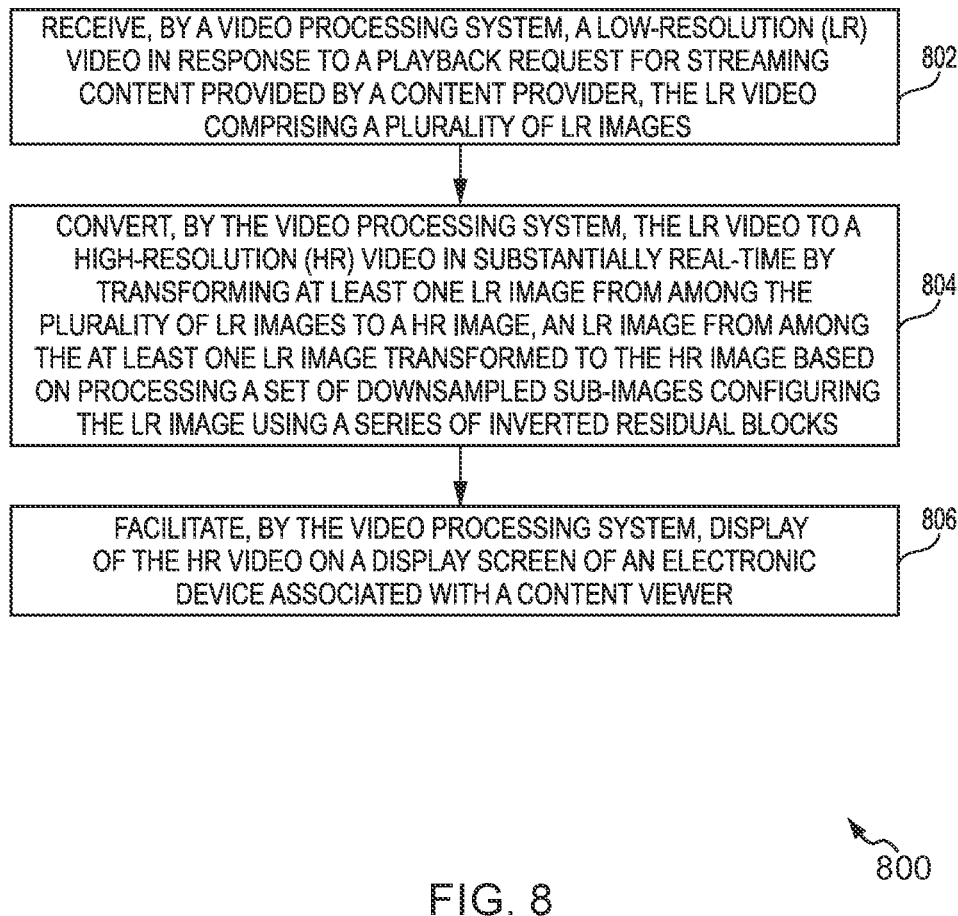
FIG. 8 shows a flow diagram of a method for enhancing resolution of a video content, in accordance with another embodiment of the invention.

FIG. 8 shows a flow diagram of a method 800 for enhancing resolution of a video content, in accordance with another embodiment of the invention. The various steps and/or operations of the flow diagram, and combinations of steps/operations in the flow diagram, may be implemented by, for example, hardware, firmware, a processor, circuitry and/or by a video processing system such as the system 150 explained with reference to FIGS. 1 to 6 and/or by a different device associated with the execution of software that includes one or more computer program instructions. The method 800 starts at operation 802.

At operation 802 of the method 800, a Low-Resolution (LR) video is received by a video processing system, such as the video processing system 150 explained with reference to FIGS. 2 to 6B, in response to a playback request for streaming content provided by a content provider. The LR video includes a plurality of LR images.

At operation 804 of the method 800, the LR video is converted by the video processing system, to a High-Resolution (HR) video in substantially real-time by transforming at least one LR image from among the plurality of LR images to a HR image. An LR image from among the at least one LR image is transformed to the HR image based on processing a set of downsampled sub-images configuring the LR image using a series of inverted residual super resolution blocks. The conversion of the at least one LR image to the HR image to transform the LR video to the HR video may be performed as explained with reference to FIGS. 2 to 5 and is not explained again.

At operation 806 of the method 800, display of the HR video is facilitated on a display screen of an electronic device associated with a content viewer.

Various embodiments disclosed herein provide numerous advantages. More specifically, the embodiments disclosed herein suggest techniques for enhancing resolution of visual content in real-time while retaining a rich quality of viewing experience. The inverted residual blocks are hardware-friendly and improve the performance of visual content resolution. Additionally, the depth-wise separable convolutions employed by the inverted residual block provide significant computational savings. Complex motion estimation and compensation techniques for enhancing resolution of video content are avoided to reduce computations and enhanced visual content with a high resolution is provided with lesser computational complexity thereby improving subjective visual quality of the visual content being displayed to the viewer. Furthermore, the method is not only performance effective but also provides a better restoration quality of the visual content with 33 times fewer latencies, thereby vastly improving the end-user experience.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processor 152, the memory 154, the I/O module 156, and the communication module 158 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method for enhancing video resolution, the method comprising:
   receiving, by a video processing system, a Low-Resolution (LR) video, the LR video comprising a plurality of LR images; and
   converting, by the video processing system, the LR video to a High-Resolution (HR) video by transforming at least one LR image from among the plurality of LR images to a HR image, an LR image from among the at least one LR image transformed to the HR image by performing the steps of:
      performing pixel unshuffle to rearrange image portions in the LR image to generate a set of downsampled sub-images corresponding to the LR image;
      extracting shallow features from the set of downsampled sub-images, wherein the shallow features extracted corresponding to the set of downsampled sub-images configure a feature space corresponding to the set of downsampled sub-images;
      processing the shallow features using a series of inverted residual blocks to generate enhanced features corresponding to the set of downsampled sub-images, wherein the shallow features are gradually modified in the feature space by the series of inverted residual blocks; and
   mapping the enhanced features to a high resolution feature space using pixel shuffle to generate the HR image corresponding to the LR image.

2. The method as claimed in claim 1, wherein the conversion of the LR video to the HR video is performed in substantially real-time in relation to a playback request for streaming content corresponding to the LR video.

3. The method as claimed in claim 2, further comprising:
   facilitating, by the video processing system, display of the HR video in relation to the playback request for streaming content corresponding to the LR video, wherein the HR video is displayed on a display screen of an electronic device associated with a content viewer.

4. The method as claimed in claim 1, wherein each inverted residual block is configured to perform at least a first convolution and a second convolution to transform the feature space corresponding to the set of downsampled sub-images from a low-dimensional feature space to an enhanced feature space, wherein the enhanced feature space comprises the enhanced features corresponding to the set of downsampled sub-images.

5. The method as claimed in claim 4, wherein a Rectified Linear Unit (ReLU) activation function is used for computing output of the first convolution and the second convolution.

6. The method as claimed in claim 1, wherein the shallow features are extracted from the set of downsampled sub-images using a 3×3 convolution layer.

7. The method as claimed in claim 1, wherein each inverted residual block of the series of inverted residual blocks is configured to expand the shallow features by an expansion factor to generate the enhanced features.

8. The method as claimed in claim 1, wherein the video processing system comprises a neural network (NN) for facilitating conversion of the LR video to the HR video, the neural network comprising a plurality of layers.

9. The method as claimed in claim 8, wherein the plurality of layers comprise at least one of a pixel unshuffle layer, one or more convolutional layers, an inverted residual layer, and a pixel shuffle layer.

10. The method as claimed in claim 8, further comprising:
decomposing, by the video processing system, the HR image into a plurality of image patches; and
determining, by the video processing system, a weight of each image patch from among the plurality of image patches,
wherein a standard deviation of weights assigned to sub-patch portions of each image patch is computed to determine the weight of the respective image patch, and
wherein the weight of each image patch is indicative of a super resolution restoration difficulty associated with the respective image patch.

11. The method as claimed in claim 10, further comprising:
computing, by the video processing system, a loss function based on the weight assigned to each image patch from among the plurality of image patches, wherein the loss function is formulated as:

$$L(\theta) = \frac{1}{N}\sum_{i=0}^{N} W_i \| f_{SR}(I_{LR}^i) - (I_{HR}^i) \|$$

where $\theta$ denotes parameters of the neural network $f_{SR}$, N is the number of training samples, $W_i$ is the computed weight according to i-th image patch, $I_{LR}^i$ and $I_{HR}^i$ denote the i-th image patch and corresponding ground truth.

12. The method as claimed in claim 11, further comprising:
optimizing, by the video processing system, the neural network to facilitate conversion of the LR video to the HR video, wherein the neural network is optimized based on the computed loss function.

13. A video processing system for enhancing video resolution, the video processing system comprising:
a memory for storing instructions; and
a processor configured to execute the instructions and thereby cause the video processing system to at least perform:
receiving a Low-Resolution (LR) video, the LR video comprising a plurality of LR images; and
converting the LR video to a High-Resolution (HR) video by transforming at least one LR image from among the plurality of LR images to a HR image, an LR image from among the at least one LR image transformed to the HR image by performing the steps of:
performing pixel unshuffle to rearrange image portions in the LR image to generate a set of downsampled sub-images corresponding to the LR image;
extracting shallow features from the set of downsampled sub-images, wherein the shallow features extracted corresponding to the set of downsampled sub-images configure a feature space corresponding to the set of downsampled sub-images;
processing the shallow features using a series of inverted residual blocks to generate enhanced features corresponding to the set of downsampled sub-images, wherein the shallow features are gradually modified in the feature space by the series of inverted residual blocks; and
mapping the enhanced features to a high resolution feature space using pixel shuffle to generate the HR image corresponding to the LR image.

14. The video processing system as claimed in claim 13, wherein the conversion of the LR video to the HR video is performed in real-time in relation to a playback request for streaming content corresponding to the LR video.

15. The video processing system as claimed in claim 14, wherein the video processing system is further caused to:
facilitate display of the HR video in relation to the playback request for the streaming content corresponding to the LR video, wherein the HR video is displayed on a display screen of an electronic device associated with a content viewer.

16. The video processing system as claimed in claim 13, wherein each inverted residual block is configured to perform at least a first convolution and a second convolution to transform the feature space corresponding to the set of downsampled sub-images from a low-dimensional feature space to an enhanced feature space, wherein the enhanced feature space comprises the enhanced features corresponding to the set of downsampled sub-images.

17. The video processing system as claimed in claim 13, wherein the video processing system comprises a neural network (NN) for facilitating conversion of the LR video to the HR video, the neural network comprising a plurality of layers.

18. The video processing system as claimed in claim 17, wherein each inverted residual block is configured to:
decompose the HR image into a plurality of image patches;
determine a weight of each image patch from among the plurality of image patches, wherein a standard deviation of weights assigned to sub-patch portions of each image patch is computed to determine the weight of a respective image patch, and wherein the weight of each image patch is indicative of a super resolution restoration difficulty associated with the respective image patch;
compute a loss function based on the weight assigned to each image patch from among the plurality of image patches; and
optimize the neural network to facilitate conversion of the LR video to the HR video, wherein the neural network is optimized based on the computed loss function.

19. A computer-implemented method for enhancing video resolution, the method comprising:
receiving, by a video processing system, a Low-Resolution (LR) video in response to a playback request for streaming content provided by a content provider, the LR video comprising a plurality of LR images;
converting, by the video processing system, the LR video to a High-Resolution (HR) video in substantially real-time by transforming at least one LR image from among the plurality of LR images to a HR image, an LR image from among the at least one LR image transformed to the HR image based on processing a set of downsampled sub-images configuring the LR image using a series of inverted residual blocks, wherein transforming the at least one LR image to the HR image comprises:
extracting shallow features from the set of downsampled sub-images, and
processing the shallow features using the series of inverted residual blocks to generate enhanced features corresponding to the set of downsampled sub-images, wherein the shallow features are gradually modified by the series of inverted residual blocks; and facilitating, by the video processing system, display of the HR video on a display screen of an electronic device associated with a content viewer.

20. The method as claimed in claim 19, wherein each inverted residual block is configured to perform at least a first convolution and a second convolution to transform the feature space corresponding to the set of downsampled sub-images from a low-dimensional feature space to an enhanced feature space, wherein the enhanced feature space comprises the enhanced features corresponding to the set of downsampled sub-images.

* * * * *